United States Patent [19]

Provence

[11] Patent Number: 5,082,410
[45] Date of Patent: Jan. 21, 1992

[54] SYSTEM FOR MOUNTING GUIDE RIDGE ON CROSS-COUNTRY SKI

[75] Inventor: Marc Provence, Thorens les Glieres, France

[73] Assignee: Salomon S. A., Chavanod, France

[21] Appl. No.: 525,109

[22] Filed: May 18, 1990

[30] Foreign Application Priority Data

May 18, 1989 [FR] France ............... 89 06883

[51] Int. Cl.$^5$ ............... F16B 15/06; A63C 5/06
[52] U.S. Cl. ................... 411/455; 280/615; 280/607; 411/456; 411/488
[58] Field of Search ............ 280/607, 614, 615, 618, 280/617; 403/405.1, 408.1, 383; 411/487, 488, 491, 451, 456, 455, 392, 424

[56] References Cited

U.S. PATENT DOCUMENTS 4,348,140 9/1982 Bergholz et al. ............ 403/308.1
4,394,096 7/1983 Stevens ..................... 403/308.1
4,629,208 12/1986 Gertsch et al. ............... 280/618

Primary Examiner—Andres Kashnikow
Assistant Examiner—Richard Camby
Attorney, Agent, or Firm—Pollock, Vande Sande & Priddy

[57] ABSTRACT

The system comprises a pin (30) including a shaft designed to be inserted in a hole so as to pass through a first element, and to be anchored by an anchoring zone in an associated hole in the second element (10), and a head located opposite the anchoring zone and designed to keep the first element mounted to the second element. The pin (30) has, extending over at least one portion of its shaft, a zone of flexion with a reduced moment of inertia in a line perpendicular to the longitudinal axis of the shaft. The dimension of the zone of the reduced moment of inertia extending in the direction of relative motion is smaller in transverse section.

18 Claims, 3 Drawing Sheets

SYSTEM FOR MOUNTING GUIDE RIDGE ON CROSS-COUNTRY SKI

FIELD OF THE INVENTION

The present invention relates to a system for mounting an element such as a guide ridge to a cross-country ski.

BACKGROUND OF THE INVENTION

A mounting of this kind is conventionally accomplished by using nails, this mounting method being satisfactory because of the relatively reduced stresses exerted on the guide ridge and because of the low cost of the nails.

However, this type of mounting has the disadvantage that the nails cannot be pre-positioned on the element to be mounted, and must be supplied separately. The result is a risk of loss of nails.

Another problem lies in the relative difficulty involved in driving the nails for an unskilled person, who may hurt himself or involuntarily damage the element requiring assembly by hitting such element instead of the nail head.

It has been suggested that the mounting be accomplished by using expansible pins unitary with the guide ridge. The expansion of the pins in the ski is caused by the penetration of nails. A pin/nail system of this kind has the advantage that it can be pre-positioned on the element to be mounted and that the nail is supplied partially engaged in the pin prior to assembly. However, this system poses problems relating to the production of the mold and to water-tightness and the penetration of water inside the ski through slots provided on the pin to allow its expansion.

Another problem arising from this type of mounting is that of relative longitudinal displacement of the guide ridge in relation to the ski during cross-country skiing, because of the extensive deformation to which the ski is subjected during skiing.

SUMMARY OF THE INVENTION

The object of the present invention is to remedy these problems and to furnish a system for mounting a first element, such as a guide ridge, to a second element, such as a cross-country ski, which solves the above-mentioned problems of prepositioning, ease of mounting, water-tightness and relative displacement of the two elements to be mounted, while being fairly inexpensive and compatible with the lightness and strength requirements that are especially important in the area of cross-country skiing.

This object is achieved by the mounting system according to the invention, because this system comprises a pin, constituted by a shaft designed to penetrate the first element through a hole provided for this purpose, and to be anchored through an anchoring zone in a corresponding hole in the second element, and by a head located opposite the anchoring zone and designed to keep the first element mounted to the second; and because the pin has, extending over at least one portion of its shaft, a zone of flexion having a reduced moment of inertia in relation to an axis transverse to the direction of relative displacement of the two elements. This zone of reduced moment of inertia promotes the flexion of the pin in the direction of relative displacement, and thus permits the relative displacement of the two elements in this direction, in the event the ski undergoes significant deformation.

According to a preferred embodiment, the zone of reduced moment of inertia has a substantially rectangular transverse section whose short side extends in the direction of the relative displacement.

In such a construction, the preferred direction of flexion lies in the direction of the short side, and the asymmetry of the section may be used for proper positioning, with the preferred flexion occurring in the direction of relative displacement of the pin in relation to the elements to be assembled.

Furthermore, various arrangements are proposed to ensure solid anchoring of the pin in the second element, and to allow this pin to be pre-positioned on the first element prior to mounting.

BRIEF DESCRIPTION OF THE DRAWINGS

These various arrangements and other features of the present invention are disclosed in the following description made with reference to the attached drawings which illustrate a preferred embodiment by way of example, and in which.

DESCRIPTION OF THE PREFERRED EMBODIMENT

Figure 1:
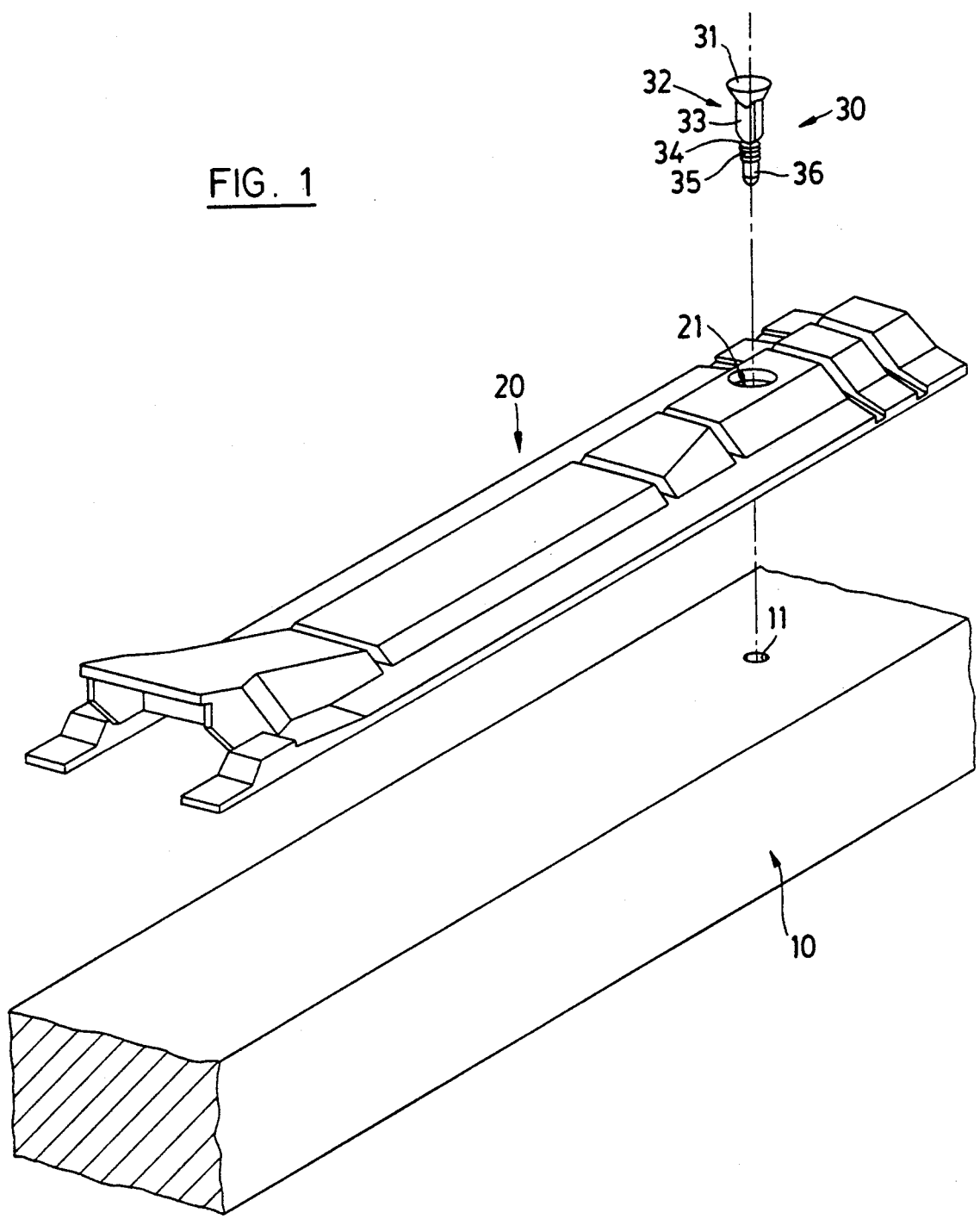
FIG. 1 is an exploded perspective view of a guide ridge and a ski prior to assembly using the system according to the invention.

FIG. 1 shows a cross-country ski 10 and a guide ridge 20 before mounting by means of a pin 30 made of a synthetic material, which is to be anchored in a hole provided for this purpose on the ski.

The guide ridge 20 is conventional and has already been disclosed in FR 87.15950. To allow the penetration of the pin 30, this ridge has a generally rectangular hole 21 whose short sides 21a form the arc of a circle and whose long sides 21b are perpendicular to the longitudinal axis 25 of the ridge. As will be seen below, the dimensions of the sides 21a, 21b of the hole are determined by the dimensions of certain parts of the pin 30. On its long sides and in its median zone, the hole 21 has two recesses 22 forming an arc of a circle corresponding to a circular hole whose diameter is greater than the distance between the two long sides 21b.

Figure 5:
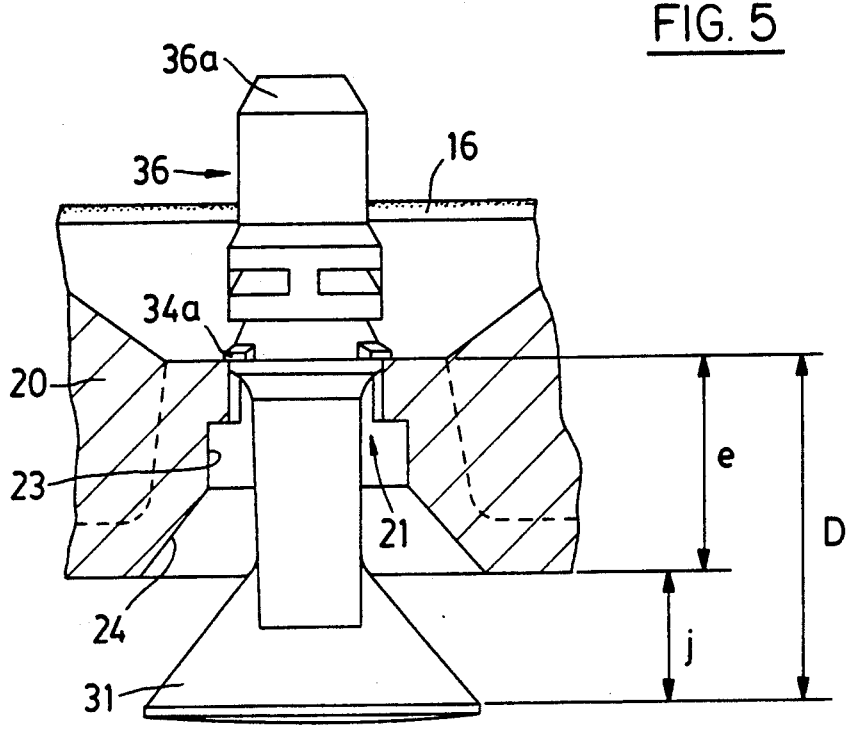
FIG. 5 is a view similar to FIG. 2 showing the pre-mounting position of the pin, with the guide ridge in inverted position.

As shown more particularly in FIG. 5, the hole 21 opens out on the upper part of the ridge 20 into a cylindrical enlargement 23 and a tapered countersunk area 24 for the head 31 of the pin 30.

The pin 30 is constituted by a head 31 and a shaft 32 which may be broken down into several distinct axial zones, i.e., a flexion zone 33, a pre-positioning zone 34, an anchoring zone 35, and a guide or centering zone 36.

The zone of flexion 33 extends just beneath the head 31 of the pin and has a generally rectangular transverse section whose short sides 33a are arc-shaped.

Figure 4:
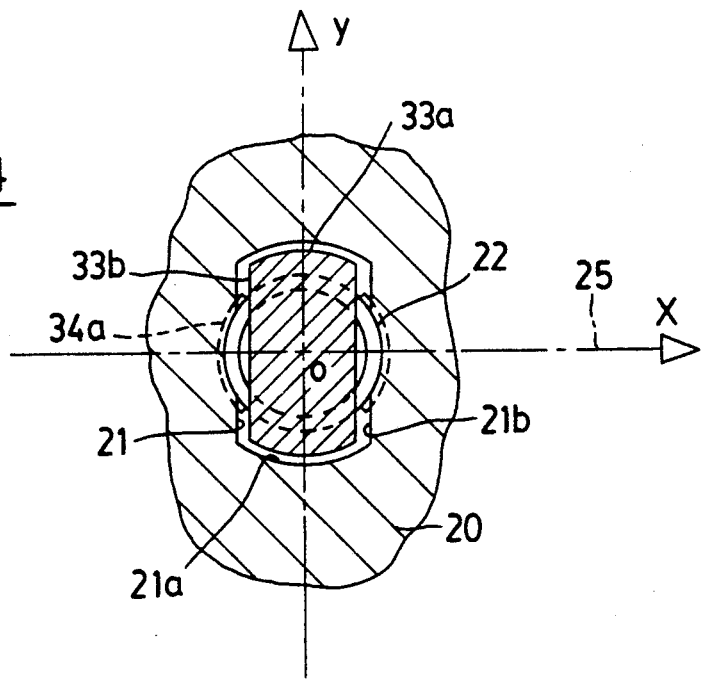
FIG. 4 is a cross-section along line IV—IV in FIG. 2.

As shown FIG. 4, the dimensions of the transverse section along axes OY and OX, i.e., the dimensions of the long sides 33b and of the short sides 33a of the zone of flexion 33, are slightly smaller than those of the section of the hole 21 of the ridge 20, so as to allow the penetration of the pin 30.

It will be noted that the flattened surfaces defined by the long sides 33b along line OY allow, in conjunction with the corresponding forms of the hole 21 of the ridge, the pin 30 to be positioned in a direction predetermined in relation to the longitudinal axis of the ridge, and this longitudinal axis defines the direction of relative displacement of the ridge 20 and of the ski 10 when the latter is deformed. As shown in FIG. 4, this positioning of the pin 30 is such that the short sides 33a extend substantially in the direction of the axis, i.e., the OX axis merges with axis 25.

As will be easily understood, the zone of flexion 33 of the pin has a reduced moment of inertia $I_y$ in relation to axis OY. Accordingly, this zone 33 of the pin has an increased bending capability in the OX direction and, therefore, in the direction of preferred relative displacement 25.

The pre-positioning zone 34 extends beneath the flexion zone. In this zone, the shaft 32 of the pin is cylindrical in form and has two fins 34a projecting outward radially in relation to the shaft 32. These two fins 34a are located diametrically opposite each other, and each extends outward peripherally over an arc of approximately 90 degrees.

As shown more especially in FIGS. 4 and 5, the fins 34a are arranged on the shaft beneath the flattened areas 33b of the zone of flexion, and their outer limit is defined by a circle whose diameter is greater than both the transverse dimension of the hole 21 of the guide ridge 20 and the diameter of the recesses 22.

Furthermore, these fins 34 are attached axially to the shaft by means of a ramp 34b which decreases in size as it extends in the pin insertion direction indicated by the arrow 1.

Ramp 34b allows the pin 30 to be inserted in the hole 21 of the ridge on the far side of the fins 34a. The pin may be inserted in this manner because of the elastic deformation of the fins.

Once the pin is inserted, it remains immobilized in the hole 21 of the ridge because it abuts against the edge of this hole, first by means of the fins 34a, as is shown especially in FIG. 5, and second, by means of its head 31.

The pin 30 may thus be pre-positioned on the ridge, which can be delivered ready for mounting without risk of pin loss. Moreover, the distance D between the fins 34a and the head 31 of the pin is greater than the thickness e of the ridge 20 at the hole 21, so as to delimit play j between the head of the pin and the upper surface of the ridge (see FIG. 5). This play j allows "pivoting" of the ridge in relation to the ski after the guide zone of the pin is inserted in the corresponding hole in the ski in order to allow definitive mounting of the ridge on the ski before the pin is driven home.

The actual anchoring zone 35, located beneath the pre-positioning zone 34, is made up essentially of two annular anchoring notches 37 projecting radially from the shaft of the pin and having an outer diameter greater than the diameter of the anchoring hole 11 in the ski 10, but smaller than the diameter of the hole 21 in the ridge.

Each of these notches 37 extends over the entire periphery of the shaft, and the two notches are offset axially in relation to each other.

Figure 2:
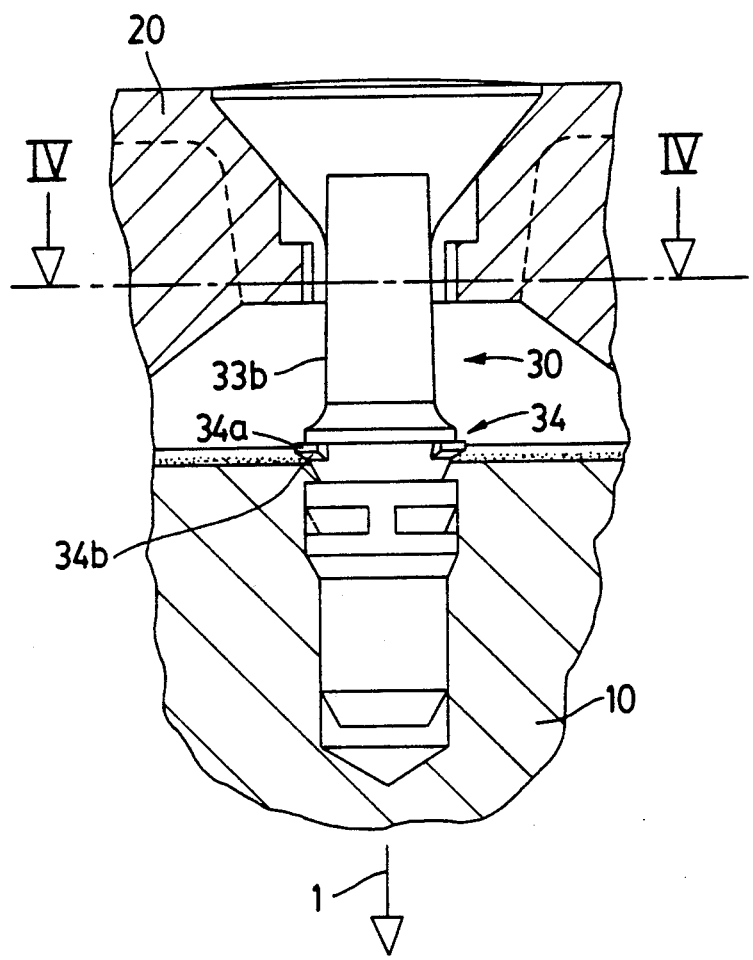
FIG. 2 is a partial longitudinal cross-section of the guide ridge after it has been mounted on the ski.
Figure 3:
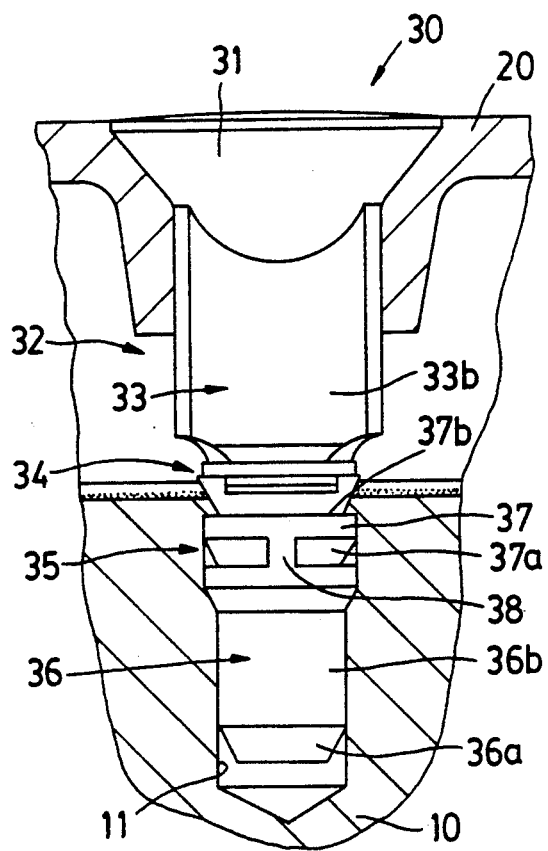
FIG. 3 is a view similar to that in FIG. 2, in transverse section.

As shown in particular in FIGS. 2 and 3, each notch 37 is connected to the shaft by a tapered ramp 37a which decreases in size in the direction of insertion, and these ramps are, in conventional fashion, designed to facilitate the insertion of these notches 37 inside hole 11.

On the other hand, the notches 37 are connected to the shaft in the direction opposite the direction of insertion 1, by means of a step-shaped form or wall 37b extending radially, thereby allowing them to produce the desired anchoring effect in the ski material.

The two annular notches 37 are, moreover, connected to each other by four axial ribs 38 which are distributed at angles of 90 degrees on the periphery of the shaft and which extend along the same outer diameter as do the notches.

These four axial ribs 38 thus project radially outward from the shaft of the pin and are designed to be anchored in the material of the ski in order to prevent the pin from rotating in relation to the ski.

These four ribs 38 are provided to facilitate the replacement of the pin. To effect this replacement, the used pin must be destroyed by drilling into it, and the ribs 38 prevent the pin from rotating under the effect of the drill bit at the beginning of the drilling operation.

Finally, the guide zone 36, designed to facilitate the insertion of the pin in hole 11 of the ski 10, is located underneath the anchoring zone 35, and thus at the very end of the shaft.

This guide zone 36 is constituted by a tapered part 36a, followed by a cylindrical part 36b whose outer diameter corresponds to that of hole 11.

As shown in FIG. 5, the axial length of guide part 36b is greater than the thickness of an adhesive layer 16 spread under the guide ridge 20, so as to allow correct positioning of the ridge before it is glued.

The mounting of the guide ridge 20 to the ski 10 using the mounting system according to the invention is accomplished in the following manner.

The ridge 20 with the pre-positioned pin is positioned on the ski and the guide zone 36 of the pin is inserted in the corresponding hole 11 in the ski.

It will be noted that, when the guide zone of the pin is inserted, the layer of adhesive substance covering the lower surface of the ridge is not yet in contact with the ski, and that the positioning of the ridge can still be perfected, if necessary.

Furthermore, the play j between the head of the pin and the ridge allows the ridge to be definitively mounted on the ski before the pin is driven home, as already indicated.

The pin 30 is then driven by force into the hole 11, for example using a hammer, so as to ensure its anchoring in the ski, and, in consequence, the mounting of the ridge on the ski.

It will be noted that the assembly can be improved by putting glue in hole 11 before positioning the pin. The glue acts not only to improve the assembly, but also to ensure water-tightness.

What is claimed is:

1. System for mounting a first element (20) to a second element (10), allowing for a relative displacement between said first and second elements in a predetermined direction (25), said system comprising a pin (30) composed of a shaft (32), adapted to penetrate said first element through a hole (21) provided for this purpose and to be anchored by an anchoring zone (35) in a corresponding hole (11) in said second element (10) and of a head (31) located opposite said anchoring zone and designed to hold said first element mounted to said second element, said pin (30) having over at least one portion of its shaft (32) a zone of flexion (33) having a transverse section with a reduced moment of inertia in relation to an axis transverse to the direction (25) of said relative displacement.

2. System for mounting a first element (20) to a second element (10), allowing for a relative displacement between said first and second elements in a predetermined direction (25), said system comprising a pin (30) composed of a shaft (32), adapted to penetrate said first element through a hole (21) provided for this purpose and to be anchored by an anchoring zone (35) in a corresponding hole (11) in said second element (10), and of a head (31) located opposite said anchoring zone and designed to hold said first element mounted to said second element, said pin (30) having over a portion of its shaft (32) between said head (31) and said anchoring zone (35) a zone of flexion (33) having a reduced moment of inertia in relation to an axis transverse to the direction (25) of said relative displacement, said zone (33) of reduced moment of inertia having a substantially rectangular transverse section having a short side (33a) extending in said direction of relative displacement (25).

3. Mounting system according to claim 2, wherein said pin has, within is anchoring zone (35), at least one retaining notch (37) projecting radially from said shaft along a diameter greater than that of said receiving hole (11) in said second element.

4. Mounting system according to claim 3, wherein each retaining notch (37) extends in a peripheral direction of said shaft.

5. Mounting system according to claim 3 or 4, wherein each retaining notch is connected to said shaft (32) on a side opposite said head of said pin, by means of a ramp which decreases in size (37a) in a direction of insertion of said pin.

6. Mounting system according to claim 3 or 4, wherein each retaining notch (37) is connected to said shaft by means of a wall (37b) extending substantially radially in the direction of said head of said pin.

7. Mounting system according to claim 3 or 4, wherein said pin comprises two successive retaining notches (37) extending axially.

8. Mounting system according to claim 3 or 4, wherein anchoring of said pin in said second element is supplemented by an adhesive material.

9. Mounting system according to claim 3 or 4, wherein said pin (30) comprises, in said anchoring zone, at least one rib (38) projecting axially outward from said shaft (32).

10. Mounting system according to claim 9, wherein said at least one axial rib (38) extends between two successive retaining notches (37).

11. Mounting system according to claim 10, wherein said pin comprises four ribs (38) distributed at angles over a periphery of said pin.

12. Mounting system according to claim 2, wherein said pin comprises on its shaft and at a distance from its head, at least one fin (34a) extending radially over a distance greater than the diameter of said hole (21) in said first element (20) said at least one fin constituting a retaining piece holding said pin on said first element (20) prior to mounting on said second element.

13. Mounting system according to claim 12, wherein said pin (30) comprises two fins (34a) located diametrically opposite each other, each of said fins extending over an arc of approximately 90 degrees.

14. Mounting system according to claim 12, wherein a distance (D) between said fins (34a) and said head (31) of said pin is greater than a thickness (e) of said ridge (2) at hole (21).

15. Mounting system according to claim 2, wherein a tapered, then cylindric 1 guide zone (36) is provided in the front part of said anchoring zone (34) of said pin.

16. Mounting system according to claim 15, wherein the axial length of said guide zone (36) of said pin is greater than the thickness of a layer of an adhesive (16) which may be spread over one of the mounting surfaces of at least one of the elements to be assembled.

17. Mounting system according to claim 3 or 4, wherein said hole (21) of said pin in said first element has a substantially rectangular transverse section, the length of whose short side (21a) is smaller than the length of the long side (33b) of said zone of flexion (33) of said pin (30).

18. Mounting system according to claim 17, wherein said hole (21) of said pin comprises a centrally-located circular recess (22) whose diameter matches the outer diameter of the anchoring notches (37) for said pin.

* * * * *